(12) United States Patent
Yanagi et al.

(10) Patent No.: US 12,341,745 B2
(45) Date of Patent: Jun. 24, 2025

(54) COMMUNICATION APPARATUS, NON-TRANSITORY COMPUTER-READABLE MEDIUM FOR COMMUNICATION APPARATUS, AND METHOD IMPLEMENTABLE BY COMMUNICATION APPARATUS

(71) Applicant: BROTHER KOGYO KABUSHIKI KAISHA, Nagoya (JP)

(72) Inventors: Satoru Yanagi, Obu (JP); Akihiro Furukawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 559 days.

(21) Appl. No.: 17/700,627

(22) Filed: Mar. 22, 2022

(65) Prior Publication Data
US 2022/0311736 A1    Sep. 29, 2022

(30) Foreign Application Priority Data
Mar. 26, 2021    (JP) ................................ 2021-053357

(51) Int. Cl.
*H04L 61/2514* (2022.01)
*G06F 1/3209* (2019.01)
*H04L 43/0811* (2022.01)

(52) U.S. Cl.
CPC ........ *H04L 61/2514* (2013.01); *G06F 1/3209* (2013.01); *H04L 43/0811* (2013.01)

(58) Field of Classification Search
CPC ..... H04L 67/52; H04L 12/28; H04L 61/2514; H04L 43/0811; H04L 12/56; H04W 40/02; H04W 40/26; H04W 76/28; H04W 52/02; H04W 68/00; G08B 21/10; H04B 1/38
See application file for complete search history.

(56) References Cited

U.S. PATENT DOCUMENTS

| 2015/0236904 A1* | 8/2015 | Tsui | H04L 41/0846 709/222 |
| 2018/0013503 A1* | 1/2018 | Nagase | G09G 5/00 |
| 2019/0373128 A1 | 12/2019 | Kozuka | |
| 2022/0165146 A1* | 5/2022 | Daoura | H04W 8/005 |

FOREIGN PATENT DOCUMENTS

JP    2019206133 A    12/2019

* cited by examiner

*Primary Examiner* — Iqbal Zaidi
(74) *Attorney, Agent, or Firm* — Scully, Scott, Murphy & Presser, PC

(57) ABSTRACT

In the operation state of the communication apparatus being the power-saving state, the communication apparatus receives a request signal from an external device, switches the operation state of the communication apparatus from the power-saving state to the normal state in response to the request signal including the source IP address being a global IP address, and performs a predetermined process in response to the operation state of the communication apparatus being switched from the power-saving state to the normal state. The predetermined process is not performed in the operation state of the communication apparatus being the power-saving state. In response to the request signal including the source IP address not being a global IP address, the communication apparatus transmits a first response signal to the request signal to the external device without switching the operation state of the communication apparatus from the power-saving state to the normal state.

9 Claims, 6 Drawing Sheets

COMMUNICATION SYSTEM2

COMMUNICATION APPARATUS, NON-TRANSITORY COMPUTER-READABLE MEDIUM FOR COMMUNICATION APPARATUS, AND METHOD IMPLEMENTABLE BY COMMUNICATION APPARATUS

CROSS-REFERENCE TO RELATED APPLICATION

This application claims priority from Japanese Patent Application No. 2021-053357 filed on Mar. 26, 2021, the content of which is incorporated herein by reference in its entirety.

TECHNICAL FIELD

The present disclosure relates to a technique for switching the operation state of a communication apparatus.

BACKGROUND

A known image printer operates in either a normal mode or a power-saving mode. The image printer in the power-saving mode activates a central processing unit (CPU) upon receiving data. The image printer in the normal mode with the active CPU determines whether the Internet protocol (IP) address of a transmitter included in the received data is a global IP address. The image printer enables a general-purpose input/output (GPIO) assert setting when the IP address of the transmitter is a global IP address, and disables the GPIO assert setting when the IP address of the transmitter is not a global IP address.

SUMMARY

The image printer does not switch the operation mode of the image printer in the power-saving mode based on the IP address of the transmitter. The operation mode of the image printer may be either maintained in the power-saving mode or switched from the power-saving mode to the normal mode based on the IP address of the transmitter.

A technique described herein allows, in an operation state of a communication apparatus being a power-saving state, appropriate determination as to whether the operation state of the communication apparatus is to be switched from the power-saving state to the normal state based on a source IP address included in a request signal.

A communication apparatus according to an aspect of the disclosure may be operable selectively in a power-saving state or in a normal state in which more power is consumed than in the power-saving state. The communication apparatus may include a controller configured to: receive, in an operation state of the communication apparatus being the power-saving state, a request signal from an external device including a source IP address being an IP address of the external device; switch the operation state of the communication apparatus from the power-saving state to the normal state in response to the request signal including the source IP address being a global IP address, the operation state of the communication apparatus being not switched from the power-saving state to the normal state in response to the request signal including the source IP address not being a global IP address; perform a predetermined process in response to the operation state of the communication apparatus being switched from the power-saving state to the normal state, the predetermined process being not performed in response to the operation state of the communication apparatus being the power-saving state; and transmit, to the external device, a first response signal to the request signal without the operation state of the communication apparatus being switched from the power-saving state to the normal state in response to the request signal including the source IP address not being a global IP address.

The communication apparatus with the above structure in the operation state being the power-saving state may receive a request signal including a source IP address from the external device. In response to the request signal including the source IP address being a global IP address, the communication apparatus switches the operation state from the power-saving state to the normal state and performs a predetermined process. In response to the request signal including the source IP address not being a global IP address, the communication apparatus transmits a first response signal to the external device without the operation state being switched from the power-saving state to the normal state. In the operation state being the power-saving state, the communication apparatus can appropriately determine whether to switch the operation state from the power-saving state to the normal state based on the source IP address included in the request signal.

A control method and a computer program for implementing the communication apparatus, and a computer-readable recording medium storing the computer program are also novel and useful. A communication system including the communication apparatus and the external device is also novel and useful.

DETAILED DESCRIPTION

Figure 1:
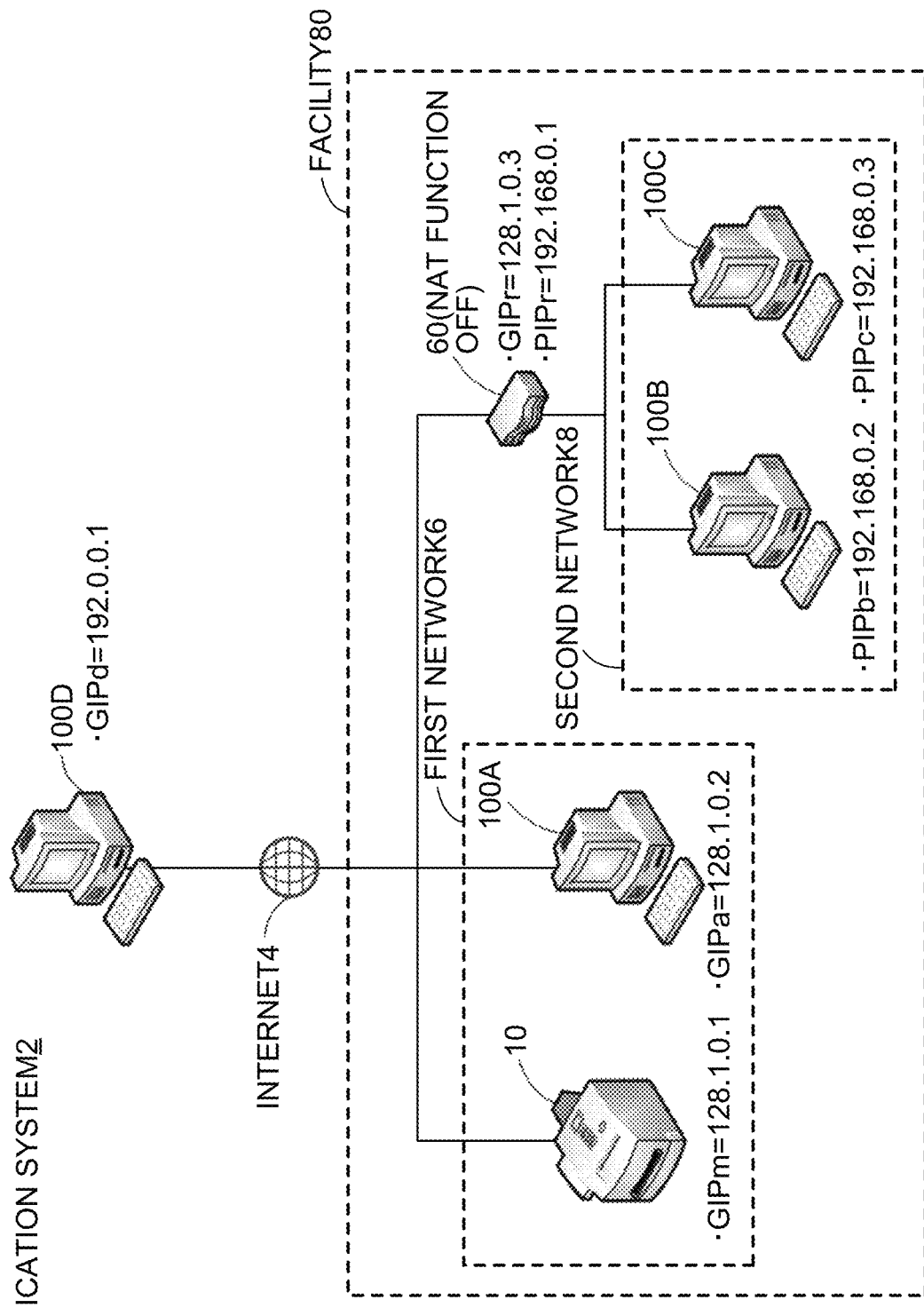
FIG. 1 is a schematic diagram of a communication system.
Figure 2:
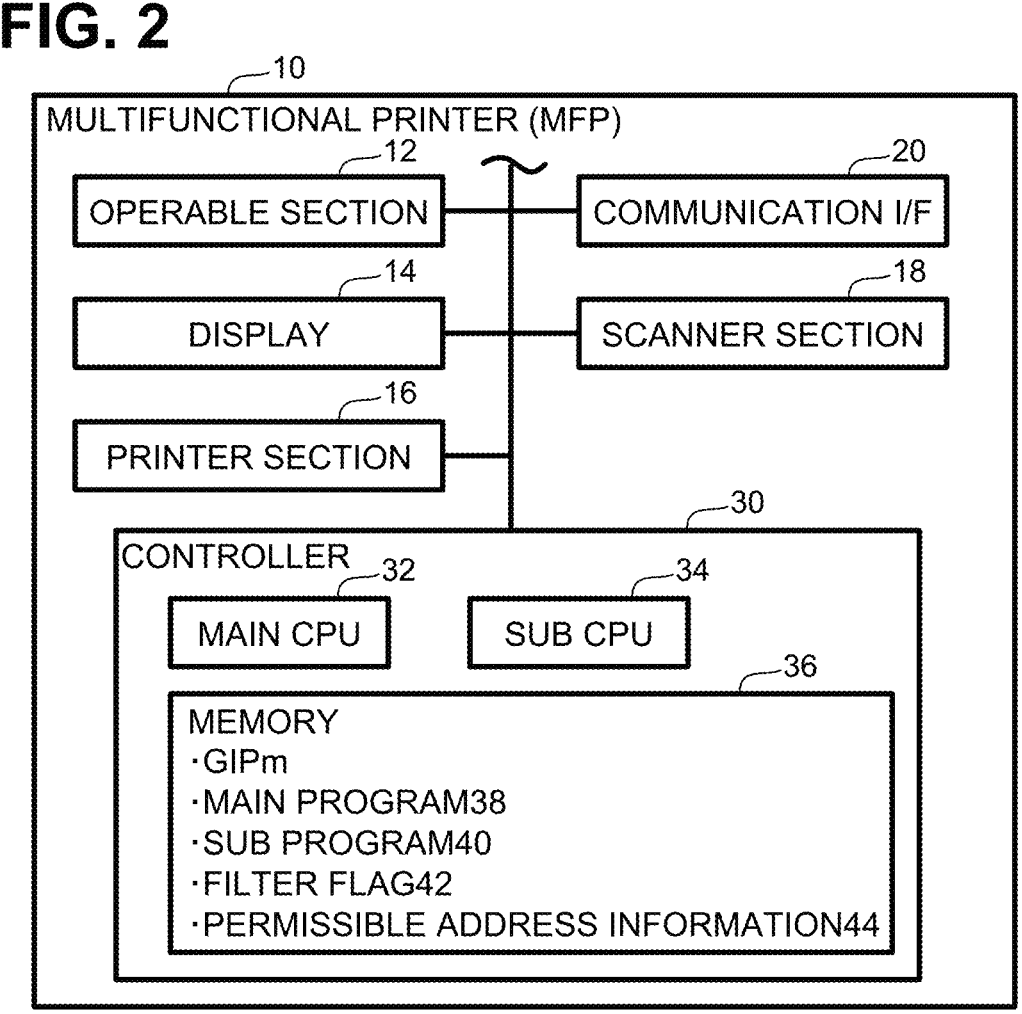
FIG. 2 is a block diagram of a multifunctional printer (MFP).

Embodiments (Structure of Communication System 2: FIGS. 1 and 2)

As shown in FIG. 1, a communication system 2 includes a multifunctional printer (hereafter, MFP) 10, a router 60, and multiple personal computers (PCs) 100A to 100D. The MFP 10, the PCs 100A to 100C, and the router 60 are installed at a facility 80. The facility 80 is, for example, a university or a company. The PC 100D is installed at a place different from the facility 80.

The MFP 10 has its assigned global IP address 128.1.0.1. The MFP 10 with the assigned global IP address can communicate through the Internet 4 without using a router installed at the facility 80. Hereafter, a GIP refers to a global IP address, and GIPm is a GIP assigned to the MFP 10.

The PC 100A has its assigned GIP 128.1.0.2 (hereafter, GIPa). The MFP 10 and the PC 100A are connected to the same network, or specifically to a first network 6 identifiable with the network address 128.1. The MFP 10 and the PC 100A can communicate with each other through the first network 6. Each of the devices 10 and 100A connected to the first network 6 has a GIP and has no private (or local) IP address. Thus, the first network 6 may not precisely be a local area network (LAN) but may be referred to as a LAN for its communicability without the Internet 4. Hereafter, PIP refers to a private IP address.

Each of the MFP 10 and the PC 100A has, as its gateway address, the GIP 128.1.0.3 of the router 60 (hereafter, GIPr). As described above, the MFP 10 and the PC 100A use the router 60 to communicate but do not use the Internet 4. The MFP 10 and the PC 100A can communicate with other devices installed at the facility 80 (e.g., the PC 100B) using the router 60.

The PC 100B has its assigned PIP 198.168.0.2 (hereafter, PIPb). The PC 100C has its assigned PIP 198.168.0.3 (hereafter, PIPc). The PC 100B and the PC 100C are connected to a second network 8 (specifically, a LAN 8) and can communicate with each other through the second network 8.

Each of the PC 100B and the PC 100C has, as its gateway address, the PIP 198.168.0.1 of the router 60 (hereafter, PIPr). The PCs 100B and 100C can communicate with other devices installed at the facility 80 (e.g., the MFP 10) using the router 60. The router 60 has the network address translation (NAT) function, which is disabled. The PCs 100B and 100C with no GIP thus cannot communicate using the Internet 4.

The PC 100D external to the facility 80 has its assigned GIP 192.0.0.1 (hereafter, GIPd).

(Structure of MFP 10: FIG. 2)

As shown in FIG. 2, the MFP 10 is a peripheral (e.g., a peripheral for the PC 100A) with multiple functions including printing and scanning. The MFP 10 includes an operable section 12, a display 14, a printer section 16, a scanner section 18, a communication interface (hereafter, I/F) 20, and a controller 30.

The operable section 12 includes multiple keys. A user can operate the operable section 12 to input various instructions into the MFP 10. The display 14 displays various items of information. The display 14 also functions as a touchscreen (or an operable section). The printer section 16 performs printing such as inkjet printing or laser printing. The scanner section 18 performs scanning such as scanning using a charge-coupled device (CCD) or scanning using a contact image sensor (CIS). The communication I/F 20 may be a wireless or wired I/F.

The controller 30 includes a main central processing unit (CPU) 32, a sub CPU 34, and a memory 36. The main CPU 32 performs various processes in accordance with a main program 38 stored in the memory 36. The sub CPU 34 performs various processes in accordance with a sub program 40 stored in the memory 36. The memory 36 includes, for example, a volatile memory and a nonvolatile memory. The memory 36 stores GIPm, a filter flag 42, and permissible address information 44. The filter flag 42 is set to a value indicating either ON or OFF. The filter flag 42 being ON indicates that the sub CPU 34 is permitted to perform a process of determining whether the source IP address in a request signal is a global IP address (S34 in FIG. 3). The filter flag 42 being OFF indicates that the sub CPU 34 is prohibited from performing the determination process. The permissible address information 44 is a global IP address at which a function implementable by the main CPU 32 (e.g., printing) is permitted. The filter flag 42 and the permissible address information 44 can be set by a user, such as an administrator of the MFP 10.

The MFP 10 is operable selectively in a normal state or in a power-saving state. In the normal state, the main CPU 32, the display 14, the printer section 16, and the scanner section 18 are ON, and the sub CPU 34 is OFF. In the power-saving state, the sub CPU 34 is ON, and the display 14, the printer section 16, the scanner section 18, and the main CPU 32 are OFF. When being ON, the main CPU 32 and the sub CPU 34 are being provided with clocks. The main CPU 32 has a clock frequency greater than the clock frequency of the sub CPU 34. The MFP 10 consumes more power in the normal state than in the power-saving state. The MFP 10 operating in the normal state switches from the normal state to the power-saving state in response to elapse of at least a predetermined period for which no user operation is received. The MFP 10 operating in the power-saving state switches from the power-saving state to the normal state in response to a user operation. The MFP 10 may also switch from the power-saving state to the normal state in response to a process being performed by the sub CPU 34 described below (FIG. 3).

(Process Performed by Sub CPU: FIG. 3)

Figure 3:
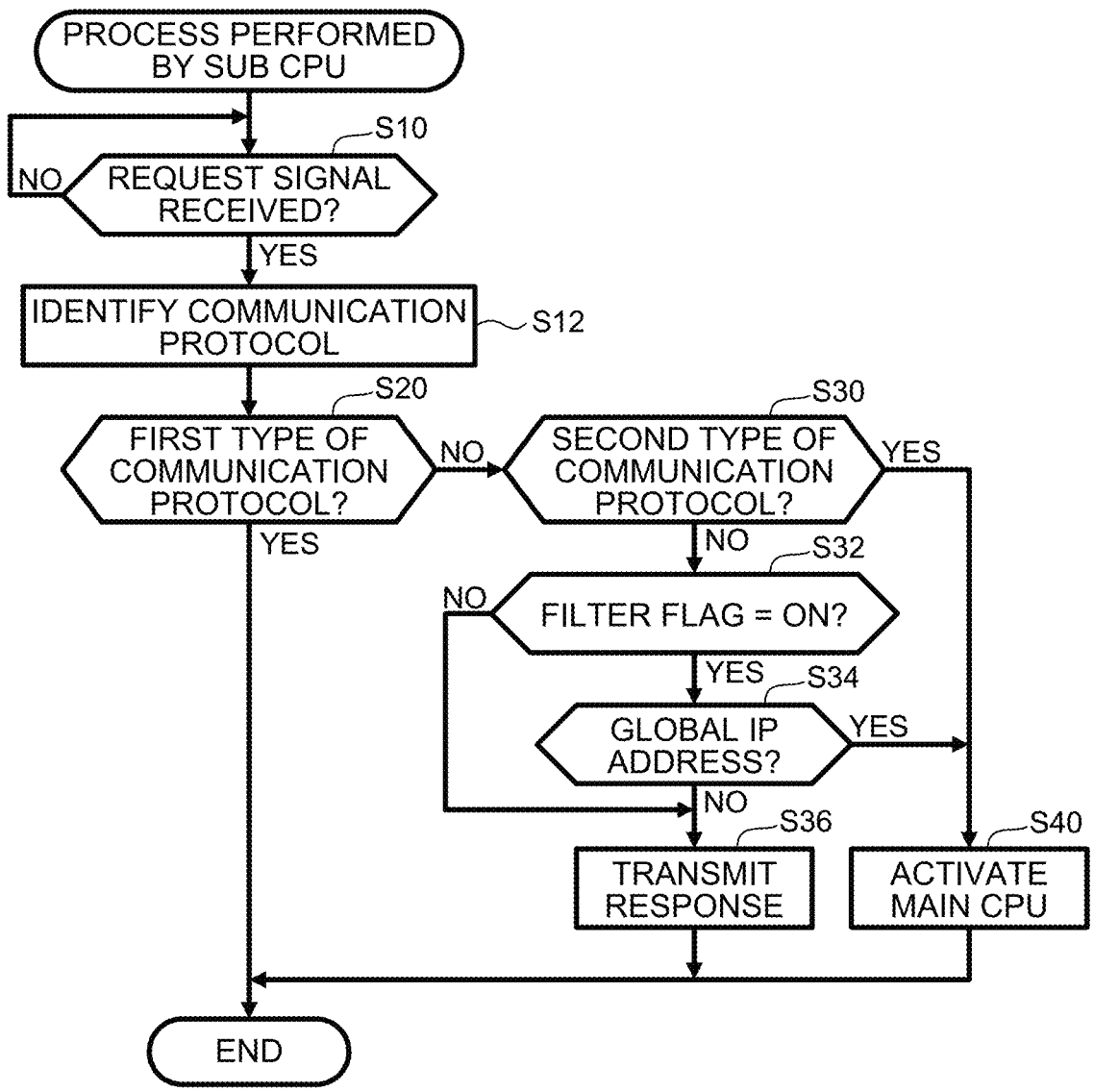
FIG. 3 is a flowchart of a process performed by a sub CPU.

Referring now to FIG. 3, the process performed by the sub CPU 34 in the MFP 10, or specifically, a process performed in the MFP 10 in the operation state being the power-saving state will be described. The PCs 100A to 100D may be hereafter collectively referred to as target PCs. The MFP 10 performs all the communication through the communication I/F 20 although hereafter not being specified as being through the communication I/F 20.

In S10, the sub CPU 34 monitors a request signal including a source IP address, a destination IP address, and protocol information being received from any target PC. The source IP address is the IP address assigned to a target PC, and the destination IP address is GIPm. The protocol information indicates a communication protocol used for transmitting and receiving a request signal. When the request signal carries a print request, the request signal may include print data. Upon receiving a request signal from the target PC (Yes in S10), the sub CPU 34 advances to S12.

In S12, the sub CPU 34 uses the protocol information in the request signal to identify the communication protocol (hereafter, target communication protocol) used for transmitting and receiving the request signal.

In S20, the sub CPU 34 determines whether the target communication protocol is a first type of communication protocol. The first type of communication protocol is a communication protocol unsupported by the MFP 10. An example of the first type of communication protocol is Simple Network Management Protocol (SNMP) traps. The sub CPU 34 ends the process shown in FIG. 3 when the target communication protocol is the first type of communication protocol (Yes in S20). More specifically, the sub CPU 34 does not transmit a response to the request signal to the target PC. The sub CPU 34 advances to S30 when the target communication protocol is not the first type of communication protocol (No in S20).

In S30, the sub CPU 34 determines whether the target communication protocol is a second type of communication protocol. The second type of communication protocol is a communication protocol supported by the MFP 10. A signal transmitted under this protocol cannot be responded by the sub CPU 34 in place of the main CPU 32. An example of the second type of communication protocol is the Line Printer Remote (LPR) protocol. The sub CPU 34 advances to S40 when the target communication protocol is the second type of communication protocol (Yes in S30). The sub CPU 34 advances to S32 when the target communication protocol is not the second type of communication protocol (No in S30). The determination result is negative in S20 and then in S30 when the target communication protocol is a third type of communication protocol. The third type of communication protocol is a communication protocol supported by the MFP 10. A signal transmitted under this protocol can be responded by the sub CPU 34 in place of the main CPU 32. An example of the third type of communication protocol is the Internet Control Message Protocol (ICMP).

When the target communication protocol is a Network Basic Input/Output System (NetBIOS) protocol or a communication protocol used for resolving hostnames such as the multicast DNS (mDNS), the sub CPU 34 determines whether the target communication protocol is the first type of communication protocol or the third type of communication protocol based on whether the request signal includes information identifying the MFP 10. The sub CPU 34 determines that the target communication protocol is the first type of communication protocol when the request signal does not include information identifying the MFP 10 (Yes in S20), and determines that the target communication protocol is the third type of communication protocol when the request signal includes information identifying the MFP 10 (No in S30).

In S32, the sub CPU 34 determines whether the filter flag 42 in the memory 36 is set ON. The sub CPU 34 advances to S34 in response to the filter flag 42 being ON (Yes in S32), and skips S34 and advances to S36 in response to the filter flag 42 being OFF (No in S32).

In S34, the sub CPU 34 determines whether the source IP address in the request signal received in S10 (hereafter, simply the source IP address) is a global IP address (GIP). For example, the region covered by each GIP is defined by the Japan Network Information Center (JPNIC). The sub CPU 34 determines that the source IP address is a GIP when the source IP address falls within the region covered by the above GIP (Yes in S34) and advances to S40. The sub CPU 34 determines that the source IP address is not a GIP when the source IP address falls out of the region covered by the above GIP (No in S34) and advances to S36. In a modification, the sub CPU 34 may determine that the source IP address is not a GIP (in other words, the source IP address is a PIP) when the source IP address is a link-local address.

In S36, the sub CPU 34 transmits a response to the request signal received in S10 to the target PC. When, for example, the request signal is a packet Internet groper (PING) signal, the sub CPU 34 transmits a PING response to the target PC. Upon completion of the processing in S36, the sub CPU 34 ends the process shown in FIG. 3. As described above, the filter flag 42 can be set by the user. For example, the user may set the filter flag 42 to OFF in an environment in which no request signal including a GIP as a source IP address is expected to be received. The processing in S34 is skipped in this case to reduce the processing load on the sub CPU 34. In this manner, the user can select whether to cause the sub CPU 34 to perform the processing in S34 depending on the environment in which the MFP 10 is installed. This improves the user convenience.

In S40, the sub CPU 34 switches the main CPU 32 from OFF to ON. Upon completion of the processing in S40, the sub CPU 34 ends the process shown in FIG. 3. In response to the main CPU 32 switching from OFF to ON, the sub CPU 34 switches from ON to OFF. In other words, the operation state of the MFP 10 switches from the power-saving state to the normal state. As described above, when the target communication protocol is the second type of communication protocol, the main CPU 32 is to perform the process shown in FIG. 4 independently of whether the source IP address is a GIP. For the target communication protocol being the second type of communication protocol, the sub CPU 34 switches the main CPU 32 from OFF to ON without determining whether the source IP address is a GIP. In other words, the operation state of the MFP 10 switches from the power-saving state to the normal state. The sub CPU 34 can thus perform appropriate processing in accordance with the target communication protocol.

Figure 4:
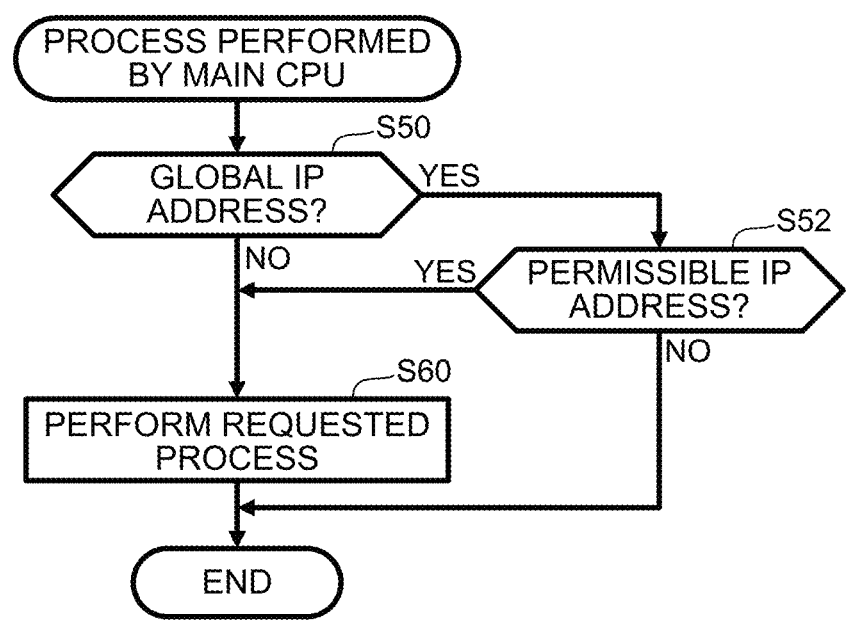
FIG. 4 is a flowchart of a process performed by a main CPU.

(Process Performed by Main CPU 32: FIG. 4)

The process performed by the main CPU 32 in the MFP 10 will now be described with reference to FIG. 4. The process shown in FIG. 4 is performed in response to the processing in S40 in FIG. 3 being performed.

The processing in S50 is the same as the processing in S34 in FIG. 3. When the determination result is affirmative (Yes) in S50, the main CPU 32 advances to S52. When the determination result is negative (No) in S50, the main CPU 32 advances to S60.

In S52, the main CPU 32 determines whether the source IP address is a permissible IP address based on the permissible address information 44 in the memory 36. The determination result obtained by the main CPU 32 is affirmative (Yes) in S52 when the permissible address information 44 includes an IP address matching the source IP address. The main CPU 32 then advances to S60. The determination result obtained by the main CPU 32 is negative (No) in S52 when the permissible address information 44 includes no IP address matching the source IP address. The main CPU 32 then ends the process shown in FIG. 4.

In S60, the main CPU 32 performs a process requested based on the request signal. When, for example, the request signal carries a print request, the main CPU 32 causes the printer section 16 to perform printing based on print data included in the request signal. The main CPU 32 then transmits a print completion notification to the target PC. When, for example, the request signal is a PING signal, the main CPU 32 transmits a PING response to the target PC. Upon completion of the processing in S60, the main CPU 32 ends the process shown in FIG. 4. As described above, the permissible address information 44 can be set by the user. The user can selectively set, among global IP addresses, a global IP address for which the processing in S60 is permitted. This improves the user convenience.

Figure 5:
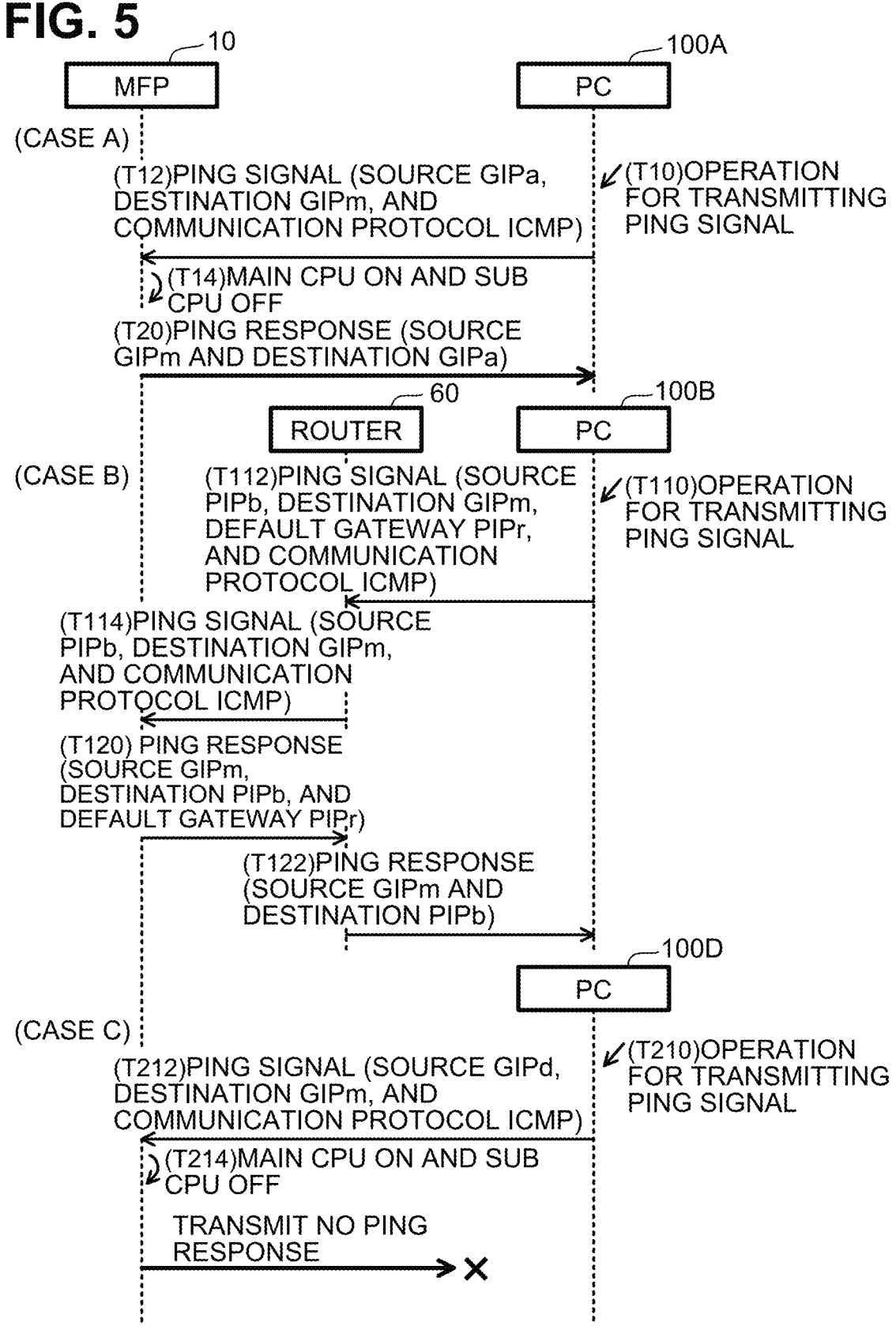
FIG. 5 is a sequence diagram describing transmission of a packet Internet groper (PING) signal in cases A to C.
Figure 6:
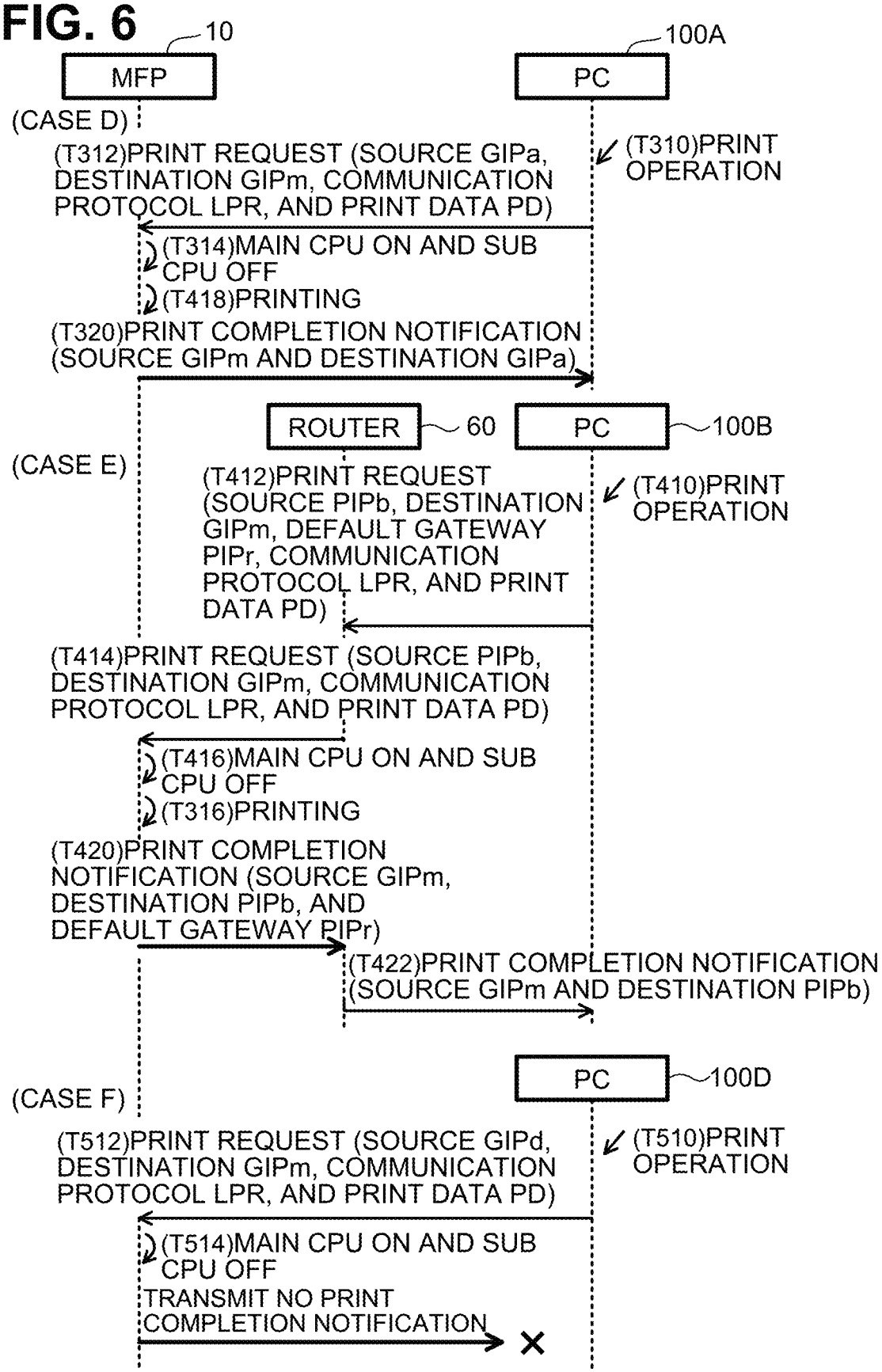
FIG. 6 is a sequence diagram describing transmission of a print request in cases D to F.

(Specific Cases A to F: FIGS. 5 and 6)

Specific cases A to F for the processes shown in FIGS. 3 and 4 will now be described with reference to FIGS. 5 and 6.

(Case A: FIG. 5)

Case A in which a PING signal is transmitted from the PC 100A to the MFP 10 will now be described with reference to FIG. 5. In case A, the operation state of the MFP 10 is the power-saving state at default. The filter flag 42 in the memory 36 in the MFP 10 is set to ON. The permissible address information 44 includes preassigned GIPa. Hereafter, a thin line indicates communication performed by the sub CPU 34 in the MFP 10, and a thick line indicates communication performed by the main CPU 32.

Upon receiving an operation for transmitting a PING signal in T10, the PC 100A transmits a PING signal including the source IP address GIPa, the destination IP address GIPm, and the protocol information ICMP to the MFP 10 in T12.

Upon receiving the PING signal from the PC 100A in T12 (Yes in S10 in FIG. 3), the sub CPU 34 in the MFP 10 identifies the ICMP as the target communication protocol (S12). The sub CPU 34 then determines that the target communication protocol ICMP is the third type of communication protocol (No in S20 and No in S30), determines that the filter flag 42 in the memory 36 is ON (Yes in S32), and determines that the source IP address GIPa in the PING signal is a GIP (Yes in S34). In T14, the sub CPU 34 switches the main CPU 32 from OFF to ON (S40). The sub CPU 34 switches from ON to OFF, causing the operation state of the MFP 10 to switch from the power-saving state to the normal state. The main CPU 32 determines that the source IP address GIPa is a GIP (Yes in S50 in FIG. 4) and determines that the IP address GIPa matching the source IP address GIPa is included in the permissible address information 44 (Yes in S52). In T20, the main CPU 32 transmits a PING response including the source IP address GIPm and the destination IP address GIPa to the PC 100A (S60).

(Case B: FIG. 5)

Case B in which a PING signal is transmitted from the PC 100B to the MFP 10 will now be described with reference to FIG. 5. The default state in case B is the same as in case A.

Upon receiving an operation for transmitting a PING signal in T110, the PC 100B transmits a PING signal including the source IP address PIPb, the destination IP address GIPm, the IP address PIPr of the default gateway, and the protocol information ICMP to the router 60 in T112.

Upon receiving the PING signal from the PC 100B in T112, the router 60 transmits a PING signal including the source IP address PIPb, the destination IP address GIPm, and the protocol information ICMP to the MFP 10 in T114.

Upon receiving the PING signal from the router 60 in T114 (Yes in S10 in FIG. 3), the sub CPU 34 in the MFP 10 determines that the target communication protocol is the ICMP (S12), determines that the target communication protocol ICMP is the third type of communication protocol (No in S20 and No in S30), determines that the filter flag 42 in the memory 36 is ON (Yes in S32), and determines that the source IP address PIPb in the PING signal is not a GIP (No in S34). In T120, the sub CPU 34 transmits a PING response including the source IP address GIPm, the destination IP address PIPb, and the IP address PIPr of the default gateway to the PC 100B (S36). The processing in T122 is the same as in T20, except that the communication targets are the router 60 and the PC 100B. As in this case, the MFP 10 transmits a PING signal to the PC 100B without switching the main CPU 32 from OFF to ON when the sub CPU 34 can transmit a response in place of the main CPU 32 and the source IP address is not a GIP. In other words, the MFP 10 transmits a PING signal to the PC 100B without switching the operation state from the power-saving state to the normal state. In this structure, the MFP 10 can reduce power consumption as compared with the structure in which the operation state is switched from the power-saving state to the normal state to transmit a PING signal to the PC 100B.

(Case C: FIG. 5)

Case C in which a PING signal is transmitted from the PC 100D to the MFP 10 will now be described with reference to FIG. 5. The default state in case C is the same as in case A.

Upon receiving an operation for transmitting a PING signal in T210, the PC 100D transmits a PING signal including the source IP address GIPd, the destination IP address GIPm, and the protocol information ICMP to the MFP 10 in T212.

Upon receiving the PING signal from the PC 100D in T212 (Yes in S10 in FIG. 3), the sub CPU 34 in the MFP 10 performs the same processing as performed after T12 in case A and switches the main CPU 32 from OFF to ON in T214 (S40). The main CPU 32 then determines that the source IP address GIPa is a GIP (Yes in S50 in FIG. 4) and determines that the permissible address information 44 includes no IP address matching the source IP address GIPd (No in S52). In this case, the main CPU 32 does not transmit a PING response.

(Case D: FIG. 6)

Case D in which a print request is transmitted from the PC 100A to the MFP 10 will now be described with reference to FIG. 6. The default state in case D is the same as in case A.

Upon receiving a print operation in T310, the PC 100A transmits a request signal including the source IP address GIPa, the destination IP address GIPm, the protocol information LPR, and the print data PD to the MFP 10 in T312.

Upon receiving the print request from the PC 100A in T312 (Yes in S10 in FIG. 3), the sub CPU 34 in the MFP 10 identifies the protocol information LPR as the target communication protocol (S12) and determines that the target communication protocol LPR is the second type of communication protocol (No in S20 and Yes in S30). In T314, the sub CPU 34 switches the main CPU 32 from OFF to ON (S40). The main CPU 32 determines that the source IP address GIPa is a GIP (Yes in S50 in FIG. 4) and determines that the permissible address information 44 includes the IP address GIPa matching the source IP address GIPa (Yes in S52). In T316, the main CPU 32 performs printing based on the print data PD and transmits a print completion notification including the source IP address GIPm and the destination IP address GIPa to the PC 100A in T320 (S60).

(Case E: FIG. 6)

Case E in which a print request is transmitted from the PC 100B to the MFP 10 will now be described with reference to FIG. 6. The default state in case E is the same as in case A.

Upon receiving a print operation in T410, the PC 100B transmits a print request to the router 60 in T412. Upon receiving the print request from the PC 100B in T412, the router 60 transmits a print request to the MFP 10 in T414. The print requests in T412 and T414 are the same as the PING signals in T112 and T114 in FIG. 5, except that the protocol information is LPR and the requests include the print data PD.

Upon receiving the print request from the router 60 in T414 (Yes in S10 in FIG. 3), the sub CPU 34 in the MFP 10 identifies the protocol information LPR as the target communication protocol (S12), determines that the target communication protocol LPR is the second type of communication protocol (No in S20 and Yes in S30), and switches the main CPU 32 from OFF to ON in T416 (S40). The main CPU 32 then determines that the source IP address PIPb is not a GIP (No in S50 in FIG. 4), performs printing based on the print data PD in T418, and transmits a print completion notification including the source IP address GIPm and the destination IP address PIPb to the PC 100B in T420 (S60).

(Case F: FIG. 6)

Case F in which a print request is transmitted from the PC 100D to the MFP 10 will now be described with reference to FIG. 6. The default state in case F is the same as in case A.

Upon receiving a print operation in T510, the PC 100D transmits a print request including the source IP address GIPd, the destination IP address GIPm, the protocol information LPR, and the print data PD to the MFP 10 in T512.

Upon receiving the print request from the PC 100D in T512 (Yes in S10 in FIG. 3), the sub CPU 34 in the MFP 10 identifies the protocol information LPR as the target communication protocol (S12), determines that the target communication protocol LPR is the second type of communication protocol (No in S20 and Yes in S30), and switches the main CPU 32 from OFF to ON in T514 (S40). The main CPU 32 then determines that the source IP address GIPd is a GIP (Yes in S50 in FIG. 4) and determines that the permissible address information 44 includes no IP address matching the source IP address GIPd (No in S52). In this case, the main CPU 32 does not perform printing. The main CPU 32 does not transmit a print completion notification.

Effects of Embodiments

As described above, the MFP 10 in the operation state being the power-saving state can receive a request signal including a source IP address from the target PC (Yes in S10 in FIG. 3). When the source IP address is a GIP (Yes in S34), the MFP 10 switches the operation state from the power-saving state to the normal state (S40) and performs the process shown in FIG. 4. When the source IP address is not a GIP (No in S34), the MFP 10 transmits a response signal (e.g., a PING response) to the target PC (S36) without switching the operation state from the power-saving state to the normal state. The MFP 10 in the operation state being the power-saving state can appropriately determine whether the operation state is to be switched from the power-saving state to the normal state based on the source IP address included in the request signal.

(Correspondence)

The MFP 10 is an example of a communication apparatus. The PCs 100A to 100D are examples of an external device. The PING signal and the print request are examples of a request signal. The process shown in FIG. 4 is an example of a predetermined process. The PING response in T122 in FIG. 5 is an example of a first response signal. The processing performed in S52 in FIG. 4 is an example of a predetermined determination process. The processing performed in S54 in FIG. 4 is an example of a transmission process. The PING response in T20 in FIG. 5 and the print completion notifications in T320, T420, and T422 in FIG. 6 are examples of a second response signal. The filter flag 42 is an example of determination information. The ON state of the filter flag 42 is an example of permission information. The OFF state of the filter flag 42 is an example of prohibition information. The processing performed in S34 is an example of a first determination process. The second type of communication protocol is an example of a predetermined communication protocol. The main CPU 32 is an example of a first CPU. The sub CPU 34 is an example of a second CPU.

Although specific examples of the present invention are described herein in detail, these are mere examples and do not limit the scope of the claims. The techniques described in the scope of the claims include various modifications and changes of the specific examples described above. Modifications of the above embodiment will be described below.

(First Modification)

After switching from OFF to ON, the main CPU 32 may store log information about a request signal received in S10 into the memory 36 without performing the processing in S50 and S52. In the present modification, the process of storing the log information into the memory 36 is an example of a predetermined process.

(Second Modification)

The memory 36 in the MFP 10 may store prohibited address information in place of the permissible address information 44. The prohibited address information is a GIP for which a function implementable by the main CPU 32 (e.g., printing) is prohibited. In the present modification, the main CPU 32 determines whether the source IP address includes a prohibited IP address in S52 in FIG. 4. The main CPU 32 advances to S60 when the prohibited address information includes no IP address matching the source IP address, and ends the process shown in FIG. 4 when the prohibited address information includes an IP address matching the source IP address.

(Third Modification)

The processing in S32 in FIG. 3 may be eliminated. In the present modification, the memory 36 in the MFP 10 may not store the filter flag 42. In the present modification, the first determiner may be eliminated.

(Fourth Modification)

The processing in S30 in FIG. 3 may be eliminated. In the present modification, the second determiner may be eliminated.

(Fifth Modification)

The main CPU 32 and the sub CPU 34 may be ON in the normal state. In another modification, the MFP 10 may not include the sub CPU 34. In the present modification, the MFP 10 may be operable in either the normal state or the power-saving state while the main CPU 32 is operating. In the present modification, the main CPU 32 is ON in the power-saving state, and the display 14, the printer section 16, the scanner section 18, and the main CPU 32 are ON in the normal state.

(Sixth Modification)

A private IP address may be assigned to the MFP 10 as its IP address.

(Seventh Modification)

In the above embodiment, each of the processes shown in FIGS. 3 to 6 is performed by the main CPU 32 and the sub CPU 34 in the MFP 10 executing the main program 38 and the sub program 40 (or software). In another modification, at least one of the processes shown in FIGS. 3 to 6 may be performed using hardware, such as a logic circuit.

The technical elements described herein or in the drawings each produce the technical effects separately or in combination, and combinations of the elements are not limited to those described in the claims as filed. The techniques illustrated herein or in the drawings may achieve multiple purposes at a time. Achieving one of the purposes may produce technical effects.

What is claimed is:

1. A communication apparatus operable selectively in a power-saving state or in a normal state in which more power is consumed than in the power-saving state, the communication apparatus comprising a controller configured to:

receive, in an operation state of the communication apparatus being the power-saving state, a request signal from an external device, the request signal including a source IP address being an IP address of the external device;

switch the operation state of the communication apparatus from the power-saving state to the normal state in response to the request signal including the source IP address being a global IP address, the operation state of the communication apparatus being not switched from the power-saving state to the normal state in response to the request signal including the source IP address being a private IP address;

perform a predetermined process in response to the operation state of the communication apparatus being switched from the power-saving state to the normal state, the predetermined process being not performed in response to the operation state of the communication apparatus being the power-saving state; and transmit, to the external device, a first response signal to the request signal without the operation state of the communication apparatus being switched from the power-saving state to the normal state in response to the request signal including the source IP address being a private IP address.

2. The communication apparatus according to claim 1, wherein the predetermined process includes:
a predetermined determination process of determining whether a predetermined condition is satisfied, and
a transmission process of transmitting, to the external device, a second response signal to the request signal in response to a determination that the predetermined condition is satisfied, and not transmitting the second response signal in response to a determination that the predetermined condition is not satisfied.

3. The communication apparatus according to claim 2, further comprising:

a memory storing a permissible IP address for which transmission of the second response signal is permitted,
wherein the predetermined condition is determined to be satisfied in response to a match between the source IP address included in the request signal and the permissible IP address stored in the memory, and
the predetermined condition is determined not to be satisfied in response to a mismatch between the source IP address included in the request signal and the permissible IP address stored in the memory.

4. The communication apparatus according to claim 1, wherein the controller is further configured to perform, in response to the request signal received from the external device, a first determination process of determining the source IP address included in the request signal, wherein the communication apparatus further comprises a memory storing determination information being either permission information indicating that the first determination process is permitted to be performed, or prohibition information indicating that the first determination process is prohibited from being performed, wherein the controller performs the first determination process in response to the request signal received from the external device and the determination information stored in the memory being the permission information and does not perform the first determination process in response to the request signal received from the external device and the determination information stored in the memory being the prohibition information, wherein the controller switches the operation state of the communication apparatus from the power-saving state to the normal state in response to a determination in the first determination process that the source IP address is a global IP address, does not switch the operation state of the communication apparatus from the power-saving state to the normal state in response to a determination in the first determination process that the source IP address is a private IP address, and does not switch the operation state of the communication apparatus from the power-saving state to the normal state in response to the request signal received and the first determination process not being performed, and the controller transmits the first response signal to the external device without the operation state of the communication apparatus being switched from the power-saving state to the normal state in response to a determination in the first determination process that the source IP address is a private IP address, and transmits the first response signal to the external device without the operation state of the communication apparatus being switched from the power-saving state to the normal state in response to the request signal received and the first determination process not being performed.

5. The communication apparatus according to claim 1, wherein the controller is further configured to determine the request signal in response to the request signal received from the external device, wherein the controller switches, in response to a determination that the request signal is a signal in accordance with a predetermined communication protocol, the operation state of the communication apparatus from the power-saving state to the normal state independently of the source IP address included in the request signal being a global IP address, and switches the operation state of the communication apparatus from the power-saving state to the normal state in response to a determination that the request signal is not a signal in accordance with the predetermined communication protocol and the source IP address included in the request signal being a global IP address, and wherein the controller transmits the first response signal to the external device without the operation state of the communication apparatus being switched from the power-saving state to the normal state in response to a determination that the request signal is not a signal in accordance with the predetermined communication protocol and the source IP address included in the request signal being a private IP address.

6. The communication apparatus according to claim 1, further comprising:

a first central processing unit; and
a second central processing unit different from the first central processing unit, the first central processing unit being active consuming more power than the second central processing unit being active,
wherein the first central processing unit is inactive and the second central processing unit is active in the power-saving state, and
wherein at least the first central processing unit is active in the normal state.

7. The communication apparatus according to claim 1, wherein the communication apparatus has a global IP address assigned as an IP address of the communication apparatus.

8. A non-transitory computer readable recording medium for storing a computer program for a communication apparatus, the communication apparatus being operable selectively in a power-saving state or in a normal state in which more power is consumed than in the power-saving state, wherein the computer program, executed by the computer in the communication apparatus, causes the communication apparatus to:
receive, in an operation state of the communication apparatus being the power-saving state, a request signal from an external device, the request signal including a source IP address being an IP address of the external device;
switch the operation state of the communication apparatus from the power-saving state to the normal state in response to the request signal including the source IP address being a global IP address, the operation state of the communication apparatus being not switched from the power-saving state to the normal state in response to the request signal including the source IP address being a private IP address;

perform a predetermined process in response to the operation state of the communication apparatus being switched from the power-saving state to the normal state, the predetermined process being not performed in response to the operation state of the communication apparatus being the power-saving state; and transmit, to the external device, a first response signal to the request signal without the operation state of the communication apparatus being switched from the power-saving state to the normal state in response to the request signal including the source IP address being a private IP address.

9. A method implementable by a communication apparatus, the communication apparatus being operable selectively in a power-saving state or in a normal state in which more power is consumed than in the power-saving state, the method comprising:

receiving, in an operation state of the communication apparatus being the power-saving state, a request signal from an external device, the request signal including a source IP address being an IP address of the external device;

switching the operation state of the communication apparatus from the power-saving state to the normal state in response to the request signal including the source IP address being a global IP address, the operation state of the communication apparatus being not switched from the power-saving state to the normal state in response to the request signal including the source IP address being a private IP address;

performing a predetermined process in response to the operation state of the communication apparatus being switched from the power-saving state to the normal state, the predetermined process being not performed in response to the operation state of the communication apparatus being the power-saving state; and transmitting, to the external device, a first response signal to the request signal without the operation state of the communication apparatus being switched from the power-saving state to the normal state in response to the request signal including the source IP address being a private IP address.

\* \* \* \* \*